Figure 1:
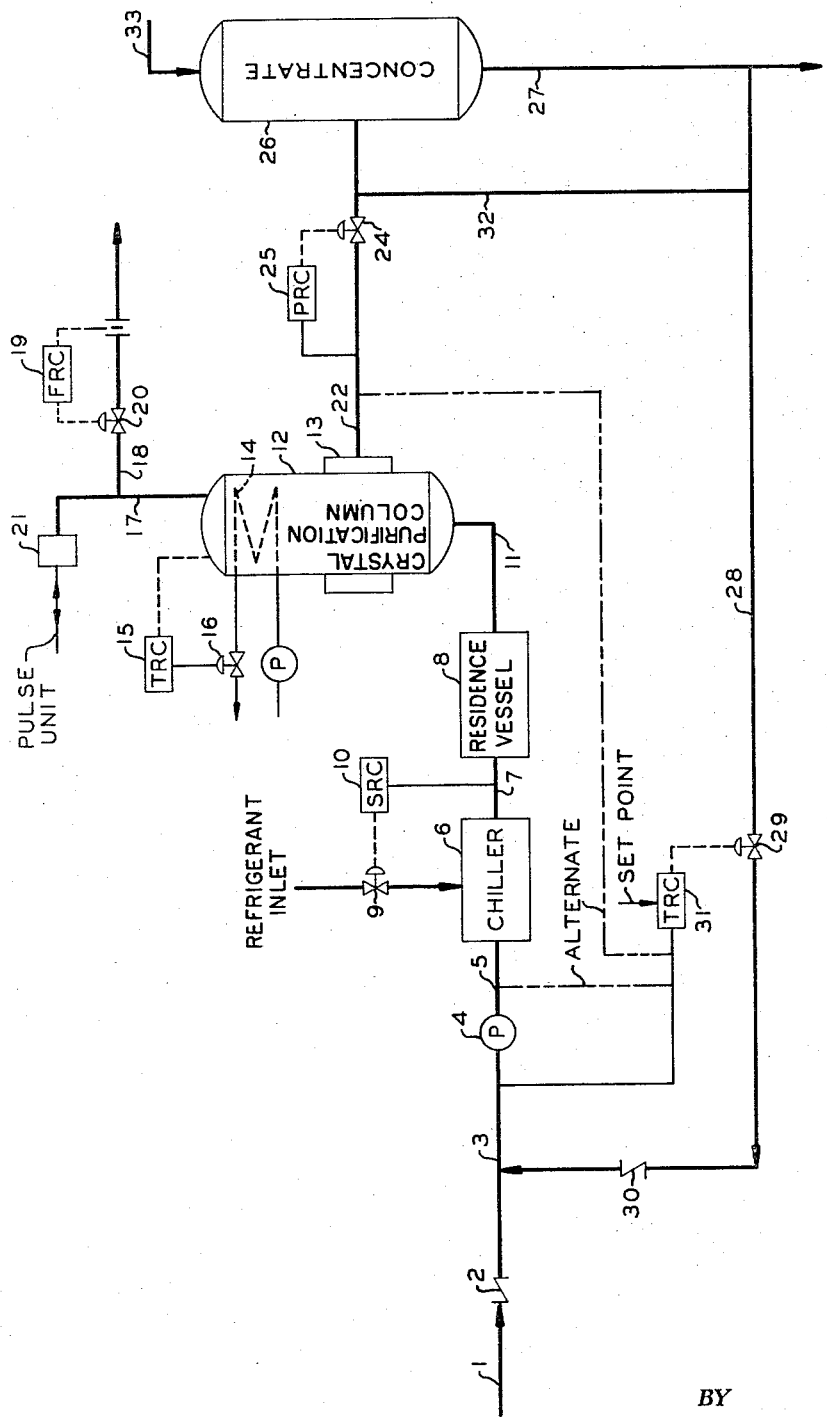

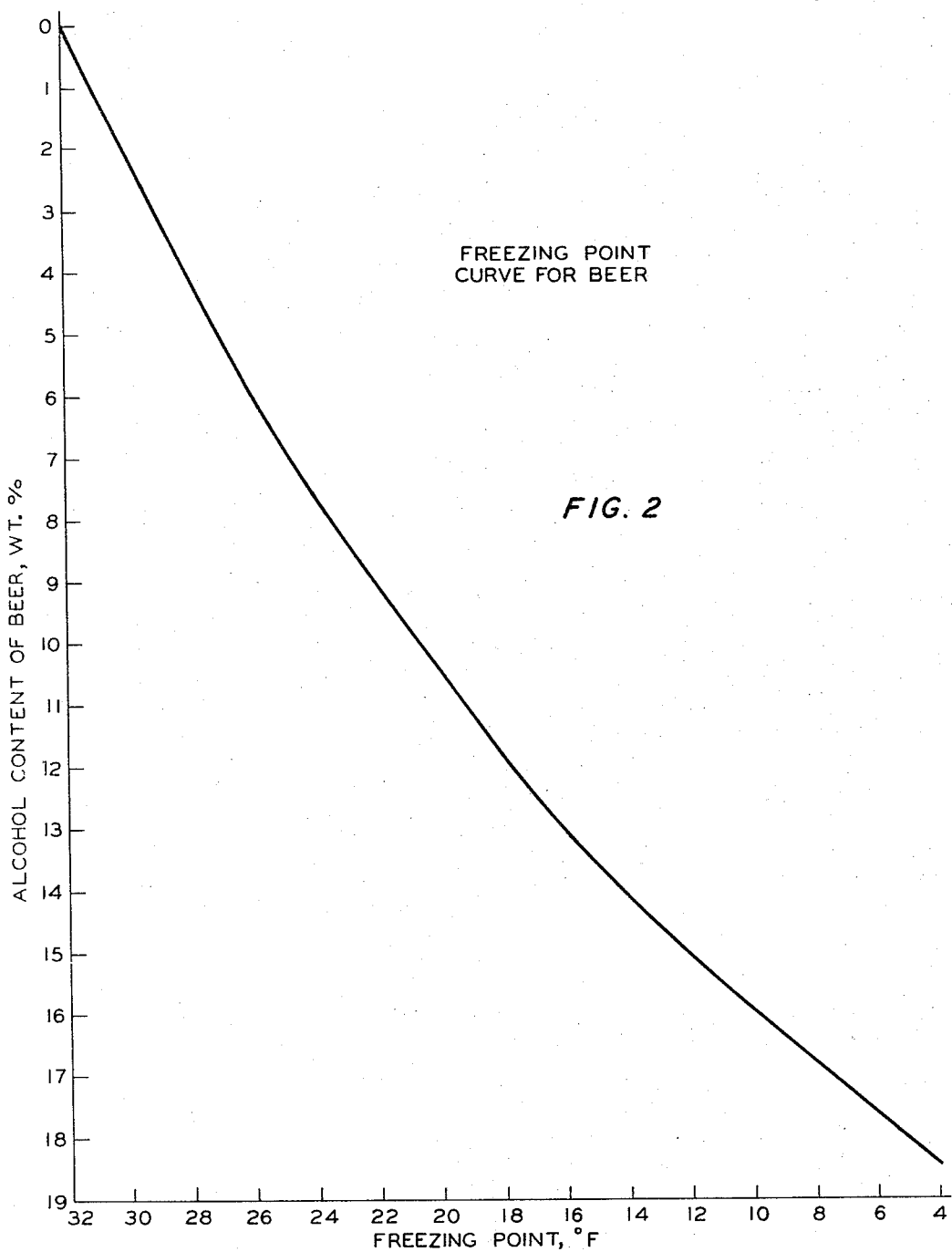

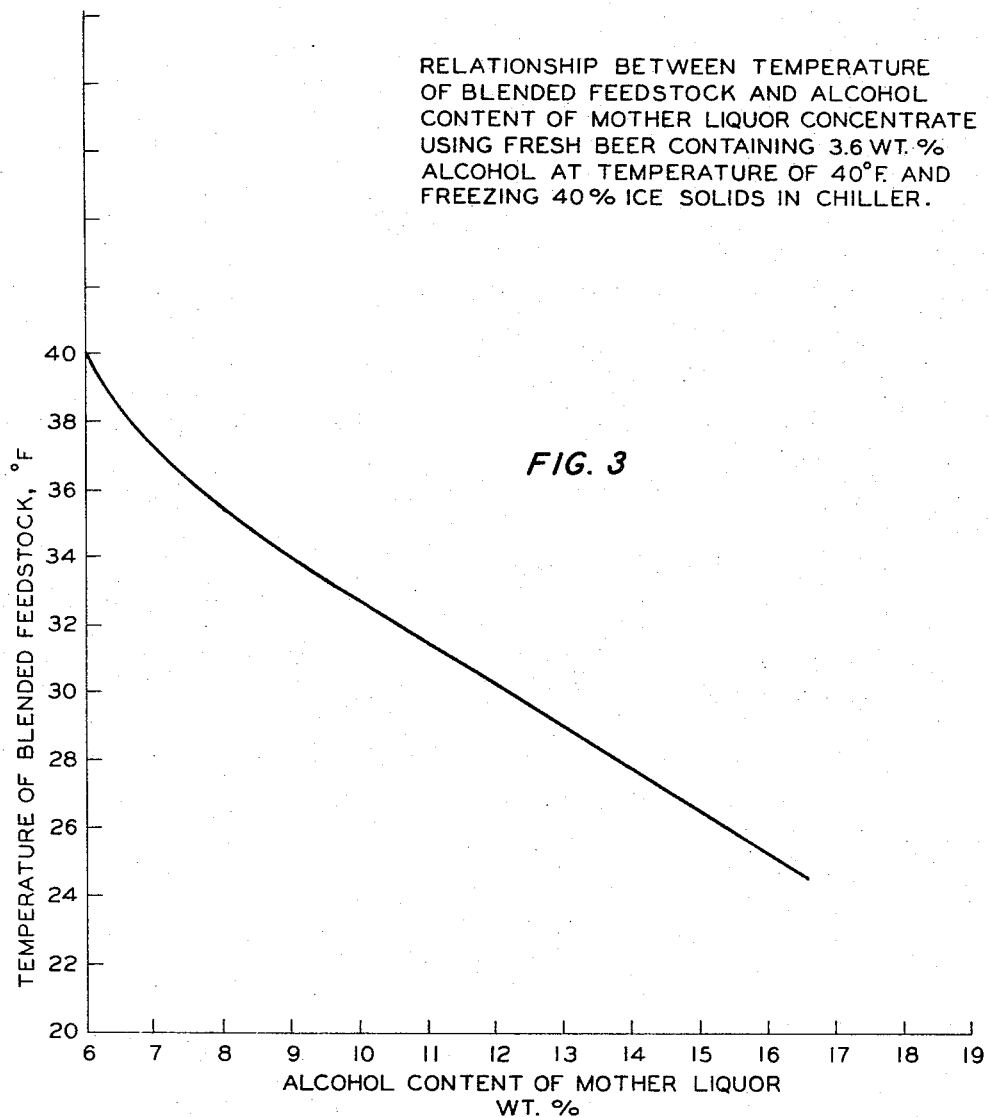

United States Patent Office 3,314,243
Patented Apr. 18, 1967

3,314,243
FRACTIONAL CRYSTALLIZATION WITH
MOTHER LIQUOR RECYCLE
Dwight L. McKay, Bartlesville, Okla., assignor to Phillips Petroleum Company, a corporation of Delaware
Filed Dec. 31, 1964, Ser. No. 422,855
12 Claims. (Cl. 62—58)

This invention relates to separation and the control of separation. In one of its aspects this invention relates to separation and control, including recycle, by temperature measurement of a stream from which components are to be separated, said temperature measurement being taken either before or after the separation. In another more specific aspect this invention relates to the control, by temperature measurement, of a fractional crystallization unit.

Purification of multi-component mixtures by means of fractional crystallization and by other methods of separation have been known for a number of years. In the case of fractional crystallization, one suitable system to effect separation thereby has been disclosed in Schmidt, Reissue 23,810 (1954). In that method, a mixture of crystals and adhering liquid is moved through a liquid removal zone, a reflux zone, and a melting zone, and includes the steps of withdrawing part of a melted product and forcing another part of the melt countercurrent to the movement of crystals in said reflux zone. These processes are generally applicable to the separation of at least one pure component from any mixture which is resolvable into its components by fractional crystallization. For example, fractional crystallization can be used for the concentration of fruit juices, vegetable juices, alcoholic beverages and other materials which comprise aqueous solutions which can be concentrated by the formulation and removal of ice crystals. The process is also of great value in the resolution of non-aqueous mixtures, for example, the separation of para-xylene from a mixture thereof with other xylene isomers and ethyl benzene. Additional mixtures which may be separated by the crystallization process of my invention are listed in U.S. Patent No. 2,854,494.

In many instances the multi-component system, e.g., beer, cannot be concentrated to the desired degree by passage through a single stage of crystallization. It is, therefore, important that the mother liquor be either recycled or introduced into a separate crystallizer so that the ultimate value of the desired component is at a desired level.

I have now discovered that in crystallization processes the concentrate or mother liquor temperature is an indication of the concentrate composition.

By various aspects of this invention, one or more of the following or other objects can be obtained.

It is an object of this invention to provide an improved method and apparatus for effecting the separation of components in the mixture. It is another object of the invention to provide a method and means for the purification of crystals formed from a multi-component mixture. Still another object of this invention is to provide an accurate method for the determination of an amount of mother liquor to be recycled in a crystallization concentration process. Yet another object of this invention is to remove water from an aqueous system. Still another object of this invention is to provide an easy and reliable method for determining the composition of a concentrate in a crystallization separation system. Still another more specific object of this invention is to provide a method and apparatus for the control of the alcoholic content in mother liquor being recycled to an alcoholic beverage crystallization concentration apparatus.

Other aspects, objects, and the several advantages of this invention are apparent from a study of this disclosure, the drawing, and the appended claims.

In accordance with the practice of this invention, mother liquor from a process wherein the temperature of the resultant mother liquor will be an indication of the composition thereof can be recycled to effect further separation, said recycle being controlled by measurement of the temperature of said mother liquor. Recycle mother liquor can be blended with feed to produce a substantially constant concentration of the feed to be separated.

The invention is broadly applicable to any separation system wherein the concentration of the separated material can be accurately indicated by measuring the temperature of the material. The invention is particularly useful in the separation of various components of any type of multi-component liquid mixture resolvable by crystallization.

The invention is particularly useful in the separation of a pure compound from a mixture by crystallization such as the one disclosed by J. Schmidt, Reissue 23,810 (1954), whereby the mixture to be separated is introduced into a heat exchange zone wherein the mixture is cooled so that a slurry of crystals is formed and that slurry of crystals is then introduced into a purification chamber through which the crystals are moved as a compact mass, to a melting zone wherein the crystals are melted. A portion of the melt is displaced countercurrently through at least a portion of the crystal mass so as to displace occluded impurities from the mass approaching the melting zone. The exact mechanism, whereby this displaced liquid corresponding to the melt, improves the purity of the final product, is not completely understood. However, it is presently believed that the substantially pure material which is refluxed through at least a portion of the crystal mass displaces occluded impurities from the crystal mass approaching the melting zone and replaces the impurities in the interstices. At least a portion of the pure material is refrozen in the interstices of the crystals. A high yield of product is obtained since the high melting product refreezes from the reflux stream as it comes in contact with the cold crystal mass moving toward the melting zone. Thus, the portion of the crystal mass which approaches the melting zone does not contain any appreciable amount of occluded impurities and the resulting product which is removed from the melting zone is of extremely high purity. It is desirable for best operation of such a purification system to remove as much of the unfrozen material (mother liquor) from the crystals as possible prior to introducing the crystals into the purification chamber. In this manner, many of the impurities can be eliminated from the purification system before subjecting the crystals to the final purification step.

The invention has been found to be particularly applicable to the concentration of beer in a beer crystallizer. In this method, an unconcentrated beer is fed to a crystallizer and water is removed from the beer in the form of crystals to yield concentrated beer.

The invention will be more fully explained and understood by referring to the accompanying drawing. It will be understood that the drawing is diagrammatic in feature and is included for illustrative purposes only. Conventional apparatus such as pumps, heat exchangers, and control instruments, have, for the most part been omitted for the sake of simplicity. The use of such equipment, however, is within the scope of the invention. Although the separation is shown on the drawing to be accomplished by the use of a crystallizer, this is used only by way of example and not by way of limitation.

Referring now to the drawing, unconcentrated liquid feed is introduced through conduit 1 through check valve 2, conduit 3, pump 4, conduit 5, to chiller 6. Feed is cooled in chiller 6 to a temperature sufficiently low to crystallize at least a portion of the constituent to be separated from the mixture. The chilled feed which can contain crystals in slurry form is then conducted through conduit 7 to soaker or residence vessel 8. This soaker 8 is provided to allow the crystals to attain a proper growth. The amount of refrigerant supplied to chiller 6 through valve 9 is controlled by solids rate controller 10 responsive to the solids content of the slurry in conduit 7. The solids content of the slurry from the chiller may be measured by any convenient means such as by a dielectric measurement of the slurry as disclosed by Ratje in U.S. Patent No. 3,093,649. Alternatively, the solids content may be measured by a gamma-ray device as disclosed in copending application Ser. No. 236,819, filed Nov. 13, 1962, now U.S. Pat. No. 3,212,283, or by making a heat balance around the chiller with a computer as disclosed in copending application Ser. No. 205,133, filed June 25, 1962. In some cases the solids content may be determined by simply measuring the temperature of the crystal slurry as disclosed in copending application Ser. No. 318,593, filed Oct. 24, 1963.

Crystals and liquid are transported from soaker 8 via conduit 11 into crystal purification column 12. Sufficient pressure is supplied to the crystal and liquid introduced into column 12 by pump 4 to move the crystals and liquid up through the column. Pulse unit 21 also serves to assist in moving the crystals through the column. The uncrystallized liquid is separated from the crystals by means of separation zone 13. The crystals which are passed up through the column are melted by heater 14. The heating fluid is controlled by temperature controller 15 and valve 16.

Crystal melt is passed through conduit 17 and withdrawn through conduit 18. Flow is controlled by flow controller 19 which operates valve 20. Reciprocating pulse unit 21 provides oscillating pressure waves through the column which assist the movement of crystals through the column and also promotes the counterflow of reflux melt into the crystal bed. Details of the operation of the pulse unit are available in U.S. Patent No. 2,854,494.

Mother liquor or concentrate is removed from purification unit 12 through conduit 22. Mother liquor passes through valve 24 which is controlled by pressure controller 25 to mother liquor collection zone 26. The mother liquor can then be drawn off through conduit 27. If desirable, additional materials such as carbon dioxide can be added to the mother liquor collection zone through conduit 33.

Recycle mother liquor is conducted through conduit 28, diaphragm motor valve 29, check valve 30 where it is introduced in conduit 3 and mixed with the initial feed. Temperature of the feedstream is monitored either in conduit 3 or conduit 5 or alternatively in mother liquor line 22 and a signal proportional to the temperature is transmitted to temperature controller 31 which in turn controls diaphragm motor valve 29. It can be seen that the amount of feed passing diaphragm motor valve 29 is determined by the temperature measured either in conduit 3, conduit 5, or conduit 22.

Conduits 22, 24, mother liquor concentrator 26, and conduits 27 and 28 are insulated to preclude external heating of the concentrated mother liquor.

If desired, mother liquor concentrator 26 can be bypassed by conduit 32.

Details of the operation of the invention will now be given. In the first place, the extent of concentration or purification obtainable by passing a feedstock through a crystallization process is limited by the amount of solids that can be frozen from the feedstock in the chiller and transported through the crystal-mother liquor separation column. This limiting solids content is generally about 50 percent but can be higher or lower depending upon the specific feedstock. Thus, if beer containing 3.6 weight percent alcohol is passed into the crystallization process and only 50 pounds of water can be frozen therefrom per 100 pounds of beer feedstock (solids content of slurry is 50 percent), then the concentration of alcohol in the mother liquor concentrate can be no higher than 7.2 weight percent. If a concentrate with a higher alcohol content is desired, then the concentrate from the first crystallizer must be passed through another crystallizer where a concentrate containing 14.4 weight percent alcohol is obtained by again forming a crystal slurry containing 50 percent ice crystals.

A higher alcohol concentrate may also, and preferably, be produced using only a single stage crystallizer by recycling some of the mother liquor concentrate back to the feed to the crystallizer in accordance with my invention. Thus, if 0.4 part of mother liquor containing 12 weight percent alcohol are blended with one part of fresh beer containing 3.6 weight percent alcohol, we obtain a blended feedstock containing 6.0 weight percent alcohol. Freezing this blended feedstock to a slurry containing 50 percent ice crystals now gives us a desired mother liquor containing 12 weight percent alcohol. Mother liquor concentrates containing higher alcohol contents are obtained by recycling additional mother liquor.

In producing highly concentrated products by recycling mother liquor around a single crystallization stage, one is confronted with the problem of how much mother liquor must be recycled in order to obtain the desired degree of concentration. I have discovered that the required amount of recycle is easily controlled in response to a simple temperature measurement of one of the crystallizer streams. This is possible because the mother liquor leaving the crystal purification column 12 in FIGURE 1 or other crystal-mother liquor separator is in thermal equilibrium with the crystals within the separator and therefore at its freezing point. Since the freezing point of a solution is one of the oldest known methods of measuring the purity of the solution, a simple temperature measurement of stream 22 in FIGURE 1 is an effective means for measuring the composition of this stream. FIGURE 2 presents a freezing point curve for beer. With the use of FIGURE 2, a temperature measurement of beer concentrate from a crystallizer provides a quick determination of the alcohol content of the concentrate. For example, if the temperature measured in stream 22 is 20° F., the alcohol concentration is found on FIGURE 2 to be 10.5 weight percent. Similar freezing point diagrams are available for other systems such as p-xylene, methylvinylpyridine, benzene, toluene, etc.

All that is necessary, therefore, to produce beer concentrate containing 10.5 weight percent alcohol from regular strength beer according to the first embodiment of my invention is to apply a set point of 20° F. to temperature-recorder-controller 31. Controller 31 then manipulates the flow of recycle through valve 29 until the measured temperature in line 22 equals 20° F. Suitable set points are also applied to the other controllers, for example, a value of, say, 40 is applied to solids-recorder-controller 10 and a value of, say, 75° F. to temperature-recorder-controller 15.

According to the second embodiment of my invention, the flow of recycle mother liquor is manipulated in response to the temperature of the blended mother liquor and fresh feedstock. As illustrated in FIGURE 1, this temperature is measured in line 3 or line 5. Since the fresh feed in line 1 has a constant composition and constant temperature, and constant amount of solids are frozen in chiller 6, a relationship exists between the temperature in line 3 or line 5 and the composition of mother liquor concentrate in line 22. Determination of one point on this relationship will be illustrated. Assume the beer feedstock in line 1 has a temperature of 40° F. and an alcohol content of 3.6 weight percent (normal for the average brewery). Assume the blend of feedstock and recycle mother liquor in line 5 has an alcohol content of 6 weight percent. If we freeze a slurry of 40 weight percent ice crystals in freezer 6, then the alcohol content of the mother liquor in line 22 is determined by material balance (40 pounds of water removed via line 17 per 100 pounds of beer feed in line 5) to be 10 weight percent. Temperature of the mother liquor is found from FIGURE 2 to be 20.7° F. By material balance it is easily calculated that 0.6 part of mother liquor containing 10 weight percent alcohol must be recycled to the feed containing 3.6 weight percent alcohol to obtain the blended feedstock of 6 weight percent alcohol that we desire. By a heat balance one calculates that blending 0.6 part mother liquor at 20.7° F. with 1 part fresh feed at 40° F. produces a blend with a temperature of 32.7° F. We now have one point on our relationship, that is a temperature of blended feedstock of 32.7° F. at point 5 on FIGURE 1 is obtained only when the mother liquor in line 22 contains 10 weight percent alcohol. Additional points were calculated and plotted on FIGURE 3. Thus, if we desire to produce a mother liquor containing 14.5 weight percent alcohol, we find from FIGURE 3 that we must apply a set point of 27° F. to temperature-recorder-controller 31 in FIGURE 1.

It will be appreciated that the instruments and controllers used in my invention are simple and available. It is particularly advantageous in that special instrument skills are not required to maintain the control system.

*Specific example*

Beer containing 3.6 weight percent alcohol and at a temperature of 40° F. is introduced at the rate of 100 barrels per hour through conduit 1 of FIGURE 1. It is desired to produce a concentrate in line 22 containing 14 weight percent alcohol. This is accomplished according to the first embodiment of my invention by applying a set point of 40 percent solids to controller 10 and a set point of 14° F. (obtained from FIGURE 1) to controller 31, the latter then manipulating the flow of recycle by means of valve 29 in response to the measured temperature in line 22. According to the second embodiment, I may alternatively apply a set point of 27.7° F. (obtained from FIGURE 3) to controller 31 which in this case manipulates valve 29 in response to the temperature of the blended feedstock in line 5. In either case sufficient mother liquor is recycled until said liquor contains 14 weight percent alcohol. Under these conditions, 25.7 barrels per hour of beer concentrate containing 14 weight percent alcohol are withdrawn through conduit 22 and 74.3 barrels per hour of essentially pure water rejected through conduit 18.

In actual operation, the composition and temperature of the feed in conduit 1 are constant. The feed passes through check valve 2 to conduit 3 where recycle mother liquor is added. The mixed stream of recycle mother liquor and feed passes to pump 4. Prior to entering pump 4, the temperature of the mixed recycle mother liquor and feed stream are measured and a signal corresponding to this temperature is transferred to temperature recorder controller 31. Temperature recorder controller 31 is adjusted so as to maintain the temperature of the mixed feed and mother liquor stream within a specified range. When the temperature of the mixed feed and mother liquor stream tends to go outside the predetermined limits, the temperature recorder controller 31 operates to open or close valve 29 to allow either more or less mother liquor to be recycled to the feed stream. As has heretofore been indicated, the temperature may be measured either before or after passage of the feed stream through pump 4.

Reasonable variation and modification are possible with the scope of the foregoing disclosure, the drawing and the appended claims to the invention, the essence of which is that there has been provided a method and apparatus for the separation and control, including recycle, by temperature measurement, of a stream from which components are to be separated, either before or after the separation.

I claim:

1. A process of freeze fractional crystallization for the separation of a component from a multi-component stream comprising continuously crystallizing a portion of said component to form crystals and a mother liquor measuring a temperature of representative of the temperature of said crystallization, and recycling a portion of said mother liquor in response to said temperature measurement, whereby a constant feed composition is obtained.

2. A process for the separation of a component from a multi-component feed stream by freeze fractional crystallization wherein temperature is a measurement of concentration of said component in the mother liquor product of said crystallization comprising continuously crystallizing a portion of said component from said stream recycling a portion of the mother liquor product of said crystallization to blend with said stream prior to said crystallization, measuring the temperature of said blended stream prior to said crystallization and controlling the rate of said recycle in response to said temperature measurement, whereby a constant feed composition is obtained.

3. A process for the separation of a component from a multi-component stream by freeze fractional crystallization wherein temperature is a measurement of concentration of said component in the mother liquor product of said crystallization comprising continuously crystallizing a portion of said component from said stream, recycling a portion of the mother liquor from said crystallization in response to the measured temperature of the blended mother liquor and said multi-component stream, whereby a constant feed composition is obtained.

4. A process for concentrating a component in a multi-component feedstream by freeze fractional crystallization wherein temperature of the mother liquor from said crystallization is a measurement of the concentration of said component in said mother liquor comprising continuously separating by fractional crystallization a portion of said feedstream to form mother liquor, measuring the temperature of said mother liquor, recycling and blending a portion of the mother liquor produced thereby to said feedstream, and controlling the rate of recycle in response to said temperature, whereby a constant mother liquor concentrate composition is obtained.

5. A process for the concentration of beer comprising continuously separating water from a beer feedstream by freeze fractional crystallization, measuring a temperature representative of the temperature of said crystallization, and recycling a portion of the concentrated beer in response to said temperature measurement, whereby a constant feed composition is obtained.

6. A process for concentrating beer comprising introducing beer at a constant temperature to a crystallization apparatus, continuously separating by fractional crystallization water from said beer, recycling and blending a portion of concentrated mother liquor produced thereby to said beer measuring the temperature of said blended stream, and controlling the rate of recycle in response thereto, whereby a constant beer feed composition is obtained.

7. A process for the concentration of beer comprising blending a beer feedstream at a constant temperature with a concentrated recycled mother liquor, chilling the thus blended feedstream to form crystals therein, soaking said crystals to achieve crystal growth, separating said crystals from the mother liquor, recycling said mother liquor to be blended with said beer feedstream, measuring the temperature of the blended feedstream and controlling the amount of recycled mother liquor in response thereto, whereby a constant feed composition is obtained.

8. An apparatus for separation of a component of a feedstream which comprises in combination feed conduit means for supplying a feed to be separated, fractional crystallization means for separating the feed into at least two components, recycle conduit means for recycling at least one separated component to said feed conduit means, means for controlling said rate of flow in said recycle conduit means, temperature sensing means for sensing a tempearture representative of the temperature in said fractional crystallization means, and means for controlling the flow in said recycle conduit responsive to said sensed temperature.

9. An apparatus for separation of a component of a feedstream which comprises in combination feed conduit means for supplying a feed to be separated; cooling means for crystallizing at least a portion of the component to be separated; soaker means for growing crystals of the proper size; crystal purification means for separating the crystallized component from the mother liquor; crystal melting means for transforming the crystals to liquid; recycle conduit means for returning a portion of the separated mother liquor to feed; said recycle flow control means for controlling said rate of flow in said recycle conduit means; and temperature sensing means for sensing a temperature representative of the temperature of said recycled mother liquor, said temperature sensing means being operably connected to said recycle flow control means whereby the recycle flow is controlled in response to the temperature of the recycle feed.

10. A process for the separation of a component from a multi-component stream by freeze fractional crystallization wherein temperature is a measurement of concentration of said component in the mother liquor product of said crystallization comprising continuously crystallizing a portion of said component from said stream, recycling a portion of the mother liquor from said crystallization in response to the measured temperature of the said mother liquor, whereby a constant feed composition is obtained.

11. A process for concentrating beer comprising introducing beer at a constant temperature to a crystallization apparatus, continuously separating by fractional crystallization water from said beer, recycling and blending a portion of the concentrated mother liquor produced thereby to said beer, measuring the temperature of said mother liquor, and controlling the rate of recycle in response thereto, whereby a constant beer feed composition is obtained.

12. A process for the separation of a crystallizable component from a multi-component feedstream wherein the temperature of crystallization is a measurement of the concentration of the stream comprising continuously crystallizing to separate a portion of the component from said stream to concentrate said stream in a freeze fractional crystallization process and produce a mother-liquor, recycling a portion of said mother-liquor to the feed to form a blend, sensing the temperature of said blend and modifying the recycle of mother liquor in response to said temperature to obtain a constant feed composition.

References Cited by the Examiner
UNITED STATES PATENTS

| | | | |
|---|---|---|---|
| 2,891,099 | 6/1959 | Skinner | 62—58 |
| 2,940,272 | 6/1960 | Croley | 62—58 |
| 3,233,420 | 2/1966 | Vesper | 62—58 |

NORMAN YUDKOFF, *Primary Examiner.*

G. HINES, *Assistant Examiner.*